United States Patent

Fassler et al.

[11] Patent Number: 5,802,914
[45] Date of Patent: *Sep. 8, 1998

[54] ALIGNMENT MECHANISM USING FLEXURES

[75] Inventors: Werner Fassler, Rochester; James E. Pickering, Holcomb; John E. Mooney, Rochester, all of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 655,367

[22] Filed: May 30, 1996

[51] Int. Cl.[6] .................................................. F16H 21/44
[52] U.S. Cl. ............................. 74/110; 267/182; 267/158
[58] Field of Search .............................. 74/110; 267/182, 267/158, 160, 164

[56] References Cited

U.S. PATENT DOCUMENTS

| | | | |
|---|---|---|---|
| 2,793,028 | 5/1957 | Wheeler | 267/1 |
| 3,295,808 | 1/1967 | Webb | 248/178 |
| 3,628,781 | 12/1971 | Grib | 267/160 |
| 4,269,072 | 5/1981 | Duncan | 74/5 |
| 4,322,063 | 3/1982 | Fischbeck et al. | 267/160 |
| 4,433,742 | 2/1984 | Lee | 177/229 |
| 4,495,814 | 1/1985 | Steinke | 73/514 |
| 4,525,852 | 7/1985 | Rosenberg | 378/34 |
| 4,669,606 | 6/1987 | Cisko | 74/110 |
| 4,771,644 | 9/1988 | Meron | 74/5.22 |
| 4,855,851 | 8/1989 | Radwan et al. | 360/104 |
| 4,872,342 | 10/1989 | Hanson et al. | 73/517 |
| 5,287,761 | 2/1994 | Fujii et al. | 74/110 |
| 5,293,782 | 3/1994 | Long et al. | 74/110 |
| 5,315,890 | 5/1994 | Long | 74/110 |

*Primary Examiner*—Charles A. Marmor
*Assistant Examiner*—David M. Fenstermacher
*Attorney, Agent, or Firm*—Walter S. Stevens

[57] ABSTRACT

A mechanical flexure with two legs in a symmetrical structure that provides straight line motion when a force is applied to one leg end, along an axis through both leg ends. Such a force translates leg ends solely along said axis in a straight line, without deviation in an orthogonal axis. Components attached to flexure leg ends will thus travel in a straight line in a single axis over a useful range. The flexure could also provide rotational translation over small angular ranges when used with appropriate hardware configurations. The flexure is capable of integral manufacture with other components and simultaneously provides alignment and translation functions.

12 Claims, 4 Drawing Sheets

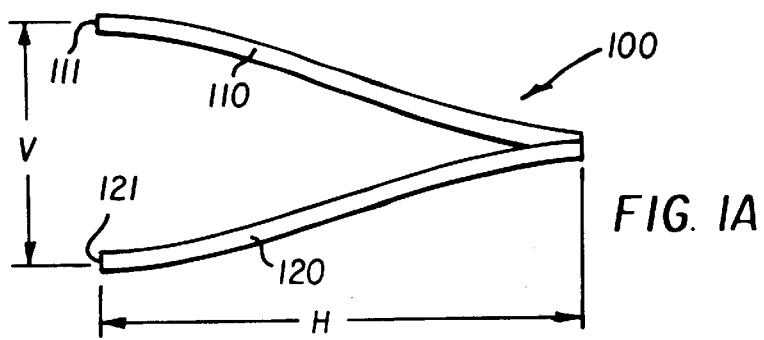
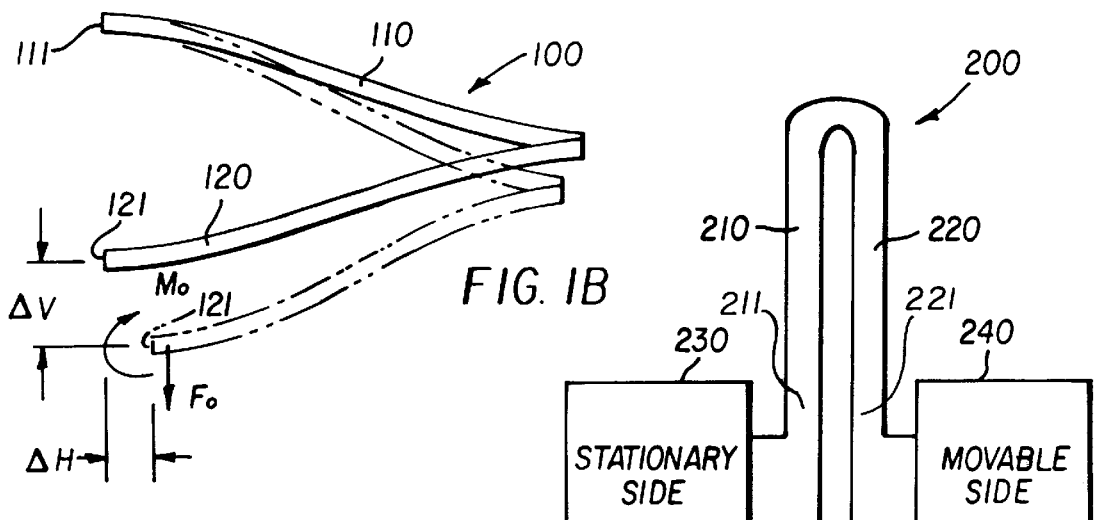
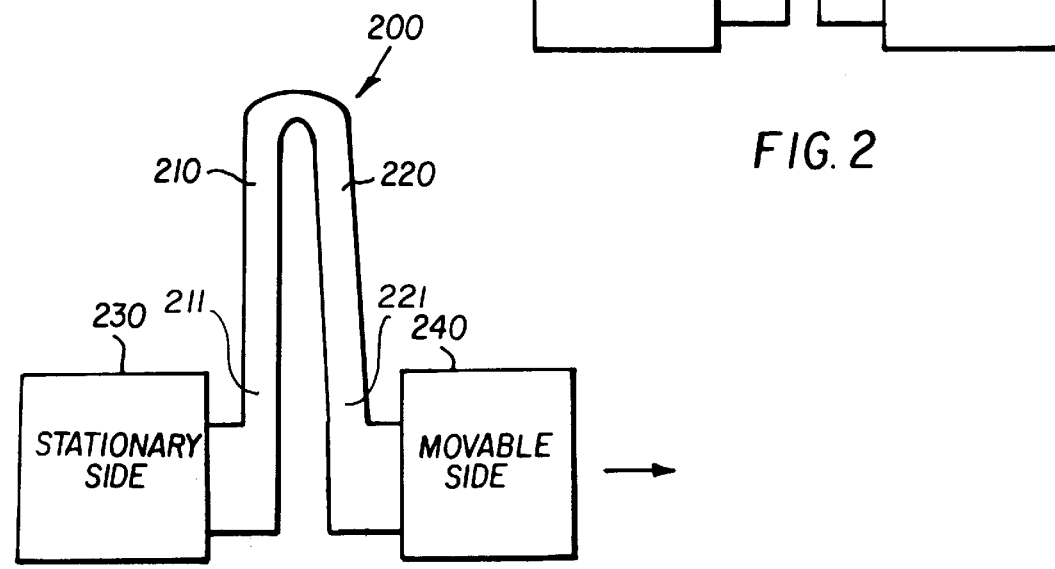

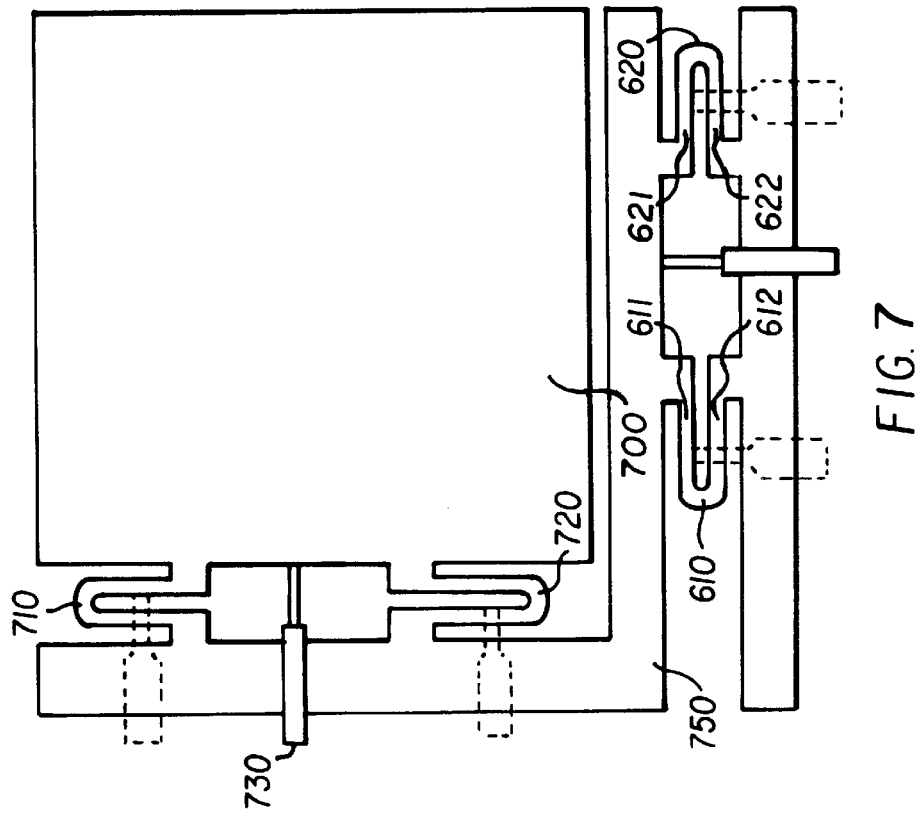
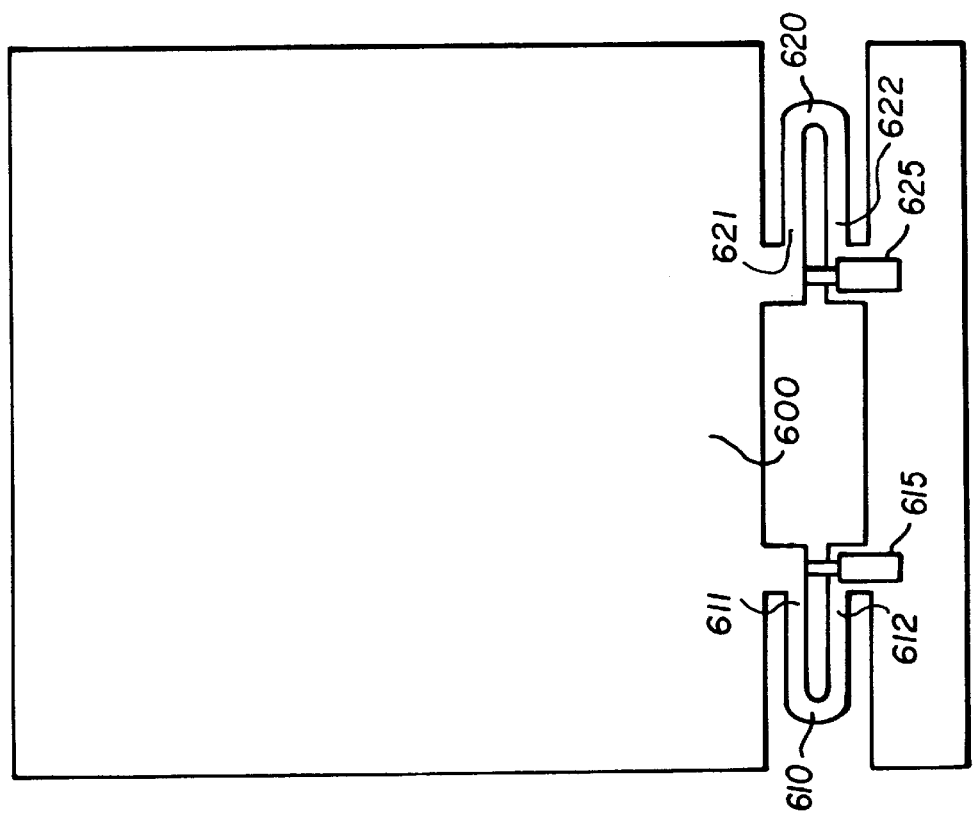

ALIGNMENT MECHANISM USING FLEXURES

BACKGROUND OF THE INVENTION

1. Field of Invention

The present invention concerns an alignment mechanism that uses flexures to both guide a single-axis translation of, and structurally support, a translation stage.

2. The Prior Art

Mechanisms providing gross movement in a single axis are known. These known mechanisms commonly employ guide shafts, bearings and other structures, and require several parts that must be carefully aligned. Such mechanisms are usually satisfactory for movements in the range of millimeters to meters. If, however, an accurate linear movement in a range of microns to millimeters is desired, such mechanisms become very expensive, and are difficult to install and maintain.

Piezo electric transducers (PZTs) have been used to provide linear motion over small distances. However, PZTs have limited mechanical ranges, are costly to purchase or manufacture, require extensive alignment and assembly procedures, and consume significant amounts of electricity. Complex electronic controllers and power supplies are also required to operate PZTs.

Moreover, linear movement from PZTs is limited to ranges of microns per device. Thus, to achieve a linear translation on the order of millimeters, many PZTs would have to be stacked such that their linear motion would be summed. Another disadvantage of PZTs is that they do not inherently provide an alignment function, but rather, provide only translation functions.

In view of the problems associated with the above mentioned mechanisms, a highly accurate mechanism for providing linear movement in a range of microns to millimeters, that do not cause location variations in a direction perpendicular to the direction of movement, that uses a minimum number of components, that is easy to fabricate and install, and that is low cost is desired. The mechanism should be capable of manufacture as an integral part of the body it is to translate and should simultaneously provide alignment and translation functions. The size of the mechanism should be scaleable such that it is able to impart linear motion to translation stages of various types and sizes.

SUMMARY OF THE INVENTION

The instant invention solves the above mentioned problems of known linear movement and alignment mechanisms by providing a mechanical flexure having two legs in a symmetrical structure that provides straight line motion along an axis defined by ends of the two legs when a force is applied to one of the two legs. Such a force translates the leg end solely along the axis in a straight line, without deviation in an orthogonal axis. Components attached to the flexure leg end will thus travel in a straight line along a single axis over a useful range.

The flexure could also be used to provide rotational translation over small angular ranges when appropriately configured.

The flexure is preferably capable of integral manufacture with other components and preferably provides both alignment and translation functions.

The instant invention advantageously has a simple design in which flexures can be manufactured as an integral part of other components, thereby eliminating the need for assembly and tighter tolerances. Alternatively, the flexures could be manufactured independently of, and assembled with, other components. In the instant invention, flexure stiffness compensates for variations in applied forces to provide linear operation. Furthermore, in the instant invention, flexure performance can be optimized by adjusting or trimming the legs of the flexure to provide exactly the response desired (analogous to the way a resistor is trimmed to provide exactly the performance needed). The instant invention does not require slides and bearings for a linear translation mechanism. The instant invention is also energy efficient relative to piezo electric transducers (PZTs).

The instant invention also does not require complex control electronics. In a refined embodiment of the present invention, a flexure of the present invention could provide rotational translation over small angular ranges.

Lastly, the size of the instant invention is scaleable such that translation stages of different types and sizes can be linearly translated.

BRIEF DESCRIPTION OF THE DRAWINGS

FIG. 1A shows a schematic of a flexure having two legs.

FIG. 1B shows the flexure of FIG. 1A when the free end of a first leg is stationary and the free end of a second leg is subject to a deflecting force.

FIG. 2 is a schematic of one implementation of the instant invention, where a flexure has one end attached to a stationary object and the other end attached to a movable object.

FIG. 3 shows the flexure of FIG. 2 when the movable object has translated away from the stationary object.

FIG. 6 illustrates another embodiment of a single axis translation stage, using flexures on one side of the stage and dual linear actuators.

FIG. 7 illustrates a two-axis translation stage embodiment with two flexures and a single linear actuator for each axis.

DETAILED DESCRIPTION

Figure 4:
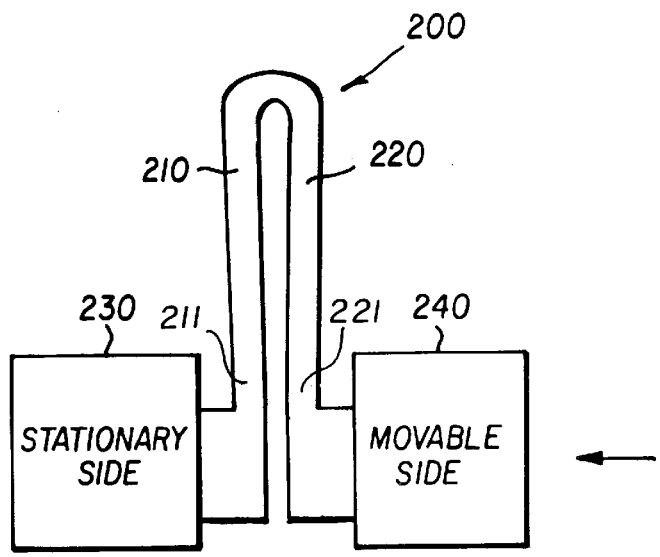
FIG. 4 shows the flexure of FIG. 2 when the movable object has translated towards the stationary object.

FIGS. 1A, 1B and 2 through 4 illustrate a mechanical flexure of the instant invention.

As shown in FIG. 1A, the flexure 100 consists of a first leg 110 and a second leg 120 that are joined at one end. Each leg has a length (L1, L2), a Young's modulus (E1, E2) and a moment of inertia (I1, I2). The legs may have the same characteristics or they may be different.

A line intersecting the free ends 111, 121 of the flexure legs 110, 120 defines an axis of movement. Generally, as shown in FIG. 1B, when one leg end (e.g., 111) is assumed stationary and a force $F_0$ is applied to other leg end leg (e.g., 121) along the axis of movement, the free leg end (e.g., 121) can translate vertically ($\Delta V$) and horizontally ($\Delta H$). The free leg end (e.g., 121) also experiences a moment $M_0$.

EQUATIONS $$n = \frac{L_2}{L_1} \quad \text{[Equation 1]}$$

$$i = \frac{E_2 I_2}{E_1 I_1} \quad \text{[Equation 2]}$$

$$\Delta H = \left[ \frac{F_0^2 L_1^5}{2(E_1 I_1)^2} \right] * \left[ \frac{i^4 + (7n - 5n^2)i^3 + (16n^2 - 65n^3 + 85n^4 - 36n^5)i^2 + (-5n^5 + 3n^6)i - n^7)}{120i^2(n+1)^2} \right] \quad \text{[Equation 3]}$$

$$0 = \left[ \frac{i^4 + (7n - 5n^2)i^3 + (16n^2 - 65n^3 + 85n^4 - 36n^5)i^2 + (-5n^5 + 3n^6)i - n^7)}{120i^2(n+1)^2} \right] \quad \text{[Equation 4]}$$

where:

$L_1$=length of first leg of flexure
$L_2$=length of second leg of flexure
$E_1$=Young's modulus of first leg of flexure
$E_2$=Young's modulus of second leg of flexure
$I_1$=moment of inertia of first leg of flexure
$I_2$=moment of inertia of second leg of flexure
$\Delta V$=vertical deflection
$\Delta H$ =horizontal deflection
$F_0$=load applied to flexure
$M_e$=moment at GE=zero slope Equations 1–4 describe the motion of the free leg end (e.g., 121) under these conditions. The ratio of-the leg lengths (or beam lengths) is N, as given in Equation 1. The stiffness ratio, i, is defined by Equation 2. Equation 3 describes the horizontal deflection ($\Delta H$) of the free leg end (e.g., 121) in terms of leg lengths and values for Young's modulus and moments of inertia. To design a flexure that only translates in a single axis, for example the vertical axis ($\Delta V$), the deflection in the other axis ($\Delta H$) must be set to zero, as shown in Equation 4.

Equation 4 is quadratic in i (the stiffness ratio) and contains the beam length ratio N as a coefficient of i. There are five roots to Equation 4; one pair of complex conjugate roots, a pair of real roots (positive and negative) and another root. Only the positive real root is of interest, and it can be found using standard mathematical techniques such as Newton-Raphson numerical methods.

FIG. 2 illustrates a flexure 200 at rest that satisfies Equation 4. In this example, the flexure's first leg end 211 is attached to a stationary component 230, and the second leg end 221 is attached to a movable component 240. In FIG. 3, force $F_0$ is applied along the axis through the leg ends 211, 221 thereby causing the movable component 240 to translate away from the stationary component 230. Although the flexure 200 moves in response to $F_0$, the movement of the component 240 is linear, along the axis defined by the leg ends 211, 221. Similarly, in FIG. 4, an oppositely directed force $-F_0$ is applied along the axis through the leg ends 211, 221 thereby causing the movable component 240 to translate toward the stationary component 230 in a straight line.

The flexure of the present invention can be formed of almost any material, as long as Equation 4 is satisfied. Accordingly, a metal (such as aluminum, steel, titanium, or an alloy, for example), a plastic, or a composite material may be used to form the flexure. If, for example, an aluminum flexure is needed to align 5" by 5" glass plates for an LCD device, the flexure may be fabricated by wire electric discharge machining (or "EDM") a piece of solid aluminum. Alternatively, other fabrication methods may be used, depending mainly on the material of which the flexure is formed.

Figure 5:
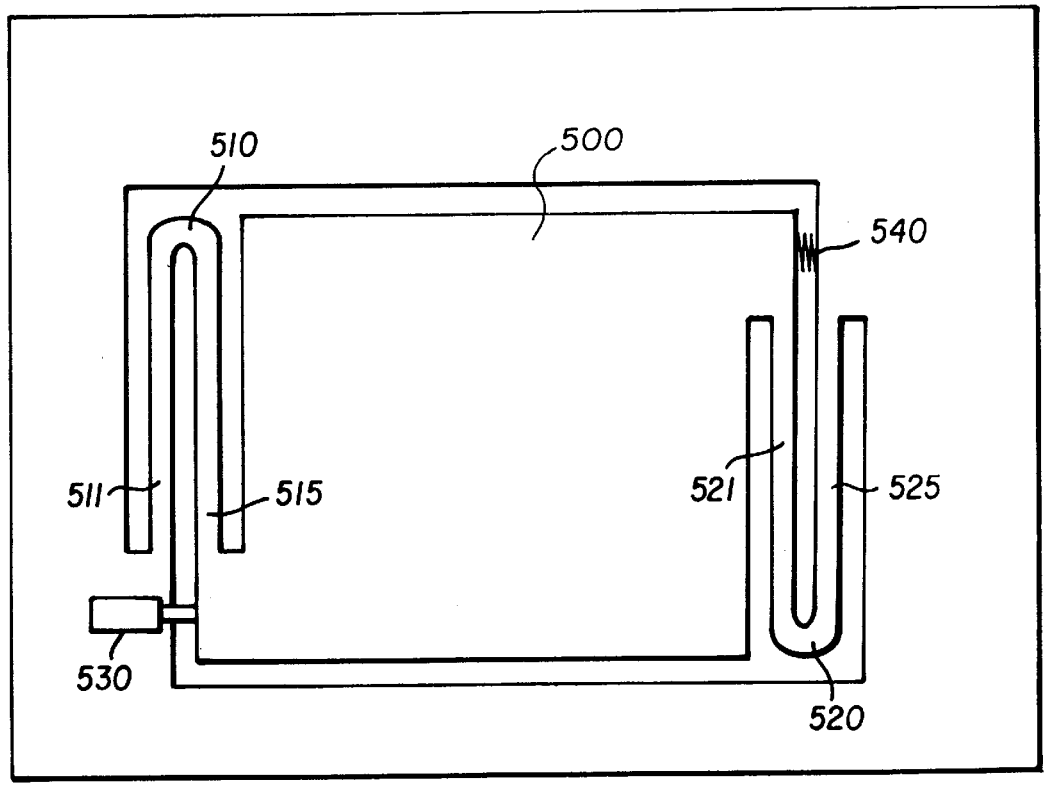
FIG. 5 illustrates a translation stage using two flexures to provide linear travel in a single axis.

FIG. 5 illustrates an implementation of the instant invention, where two flexures 510, 520 that satisfy Equation 4, are integrally located on opposite sides of a translation stage 500. A linear translator 530 is installed between the legs 511, 515 of the first flexure 510, and a spring 540 is installed between the legs 521, 525 of the second flexure 520. The linear translator 530 may be an electromechanical device (such as a piezo-electric device or a stepper motor, for example), a mechanical device (such as micrometer screws with a readout for example), or an electromagnetic device (such as a speaker coil for example). In this configuration, when the linear translator 530 urges the ends of legs 511, 515 of the first flexure 510 apart, the stage 500 is pushed in a straight line along the axis through the first flexure's leg ends. The stage movement causes the ends of legs 521, 525 of the second flexure 520 to move towards one another, thereby compressing the spring 540. If the linear translator 530 is moved in the opposite direction thereby urging the legs 511, 515 of the first flexure 510 towards each other, the ends of legs 521, 525 of the second flexure 520 would be urged apart thereby stretching the spring 540. As a result, the stage 500 would move toward the first flexure 510.

The implementation illustrated in FIG. 5 can be easily manufactured from a single piece of material (e.g., aluminum) using conventional processes such as electric discharge machining (EDM) or lithographic processes common to circuit board manufacturing. As described above, other manufacturing methods are equally feasible. This design advantageously requires no assembly beyond the installation of the linear translator 530 and the spring 540, thereby significantly increasing manufacturing accuracy, reducing assembly alignment errors, simplifying assembly and reducing cost.

Figure 9:
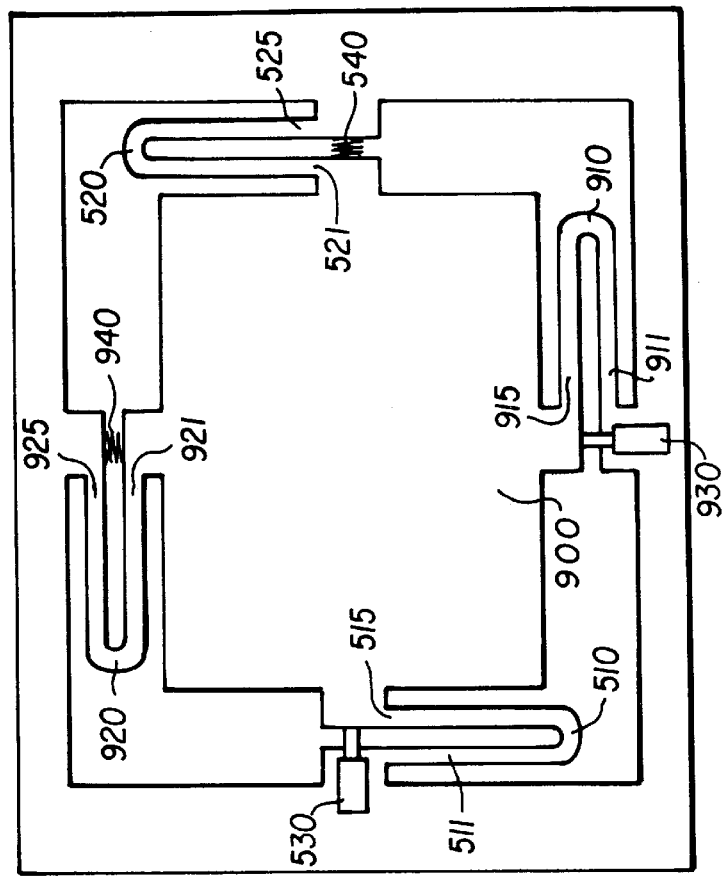
FIG. 9 illustrates a translation stage using two paired flexures to provide linear travel in two axes.

FIG. 9 illustrates a refinement of the embodiment of FIG. 5 in which a pair of flexures 910 and 920 is added to permit movement of the translation stage 900 in a second direction.

FIG. 6 shows another implementation of the instant invention. In this case, two flexures 610, 620 are located on the same side of a translation stage 600. Linear translators 615, 625 are is provided across the leg ends 611, 612, 621, 622 of each flexure 610, 620. This configuration provides some benefits over that shown in FIG. 5; namely it can provide small angular adjustments as well as linear movements. For example, if each linear translator 615, 625 is driven a different distance, the translation stage 600 will effectively rotate through a small angle. Thus, this configuration can provide both linear and angular motion of the translation stage 600.

FIG. 7 shows a variation of the single axis translation stage detailed in FIG. 6. In this example, a second pair of flexures 710, 720 have been attached to the previously stationary rail 750 that anchored the first flexure pair 610, 620. A single linear translator 730 is shown in this example for simplicity (eliminating the angular movement feature). With this configuration, precise linear movement in two axes is available. As shown in phantom, an embodiment having two linear translators per axis is equally feasible, thus providing linear and angular motion of the translation stage 700 in two axes.

Figure 8:
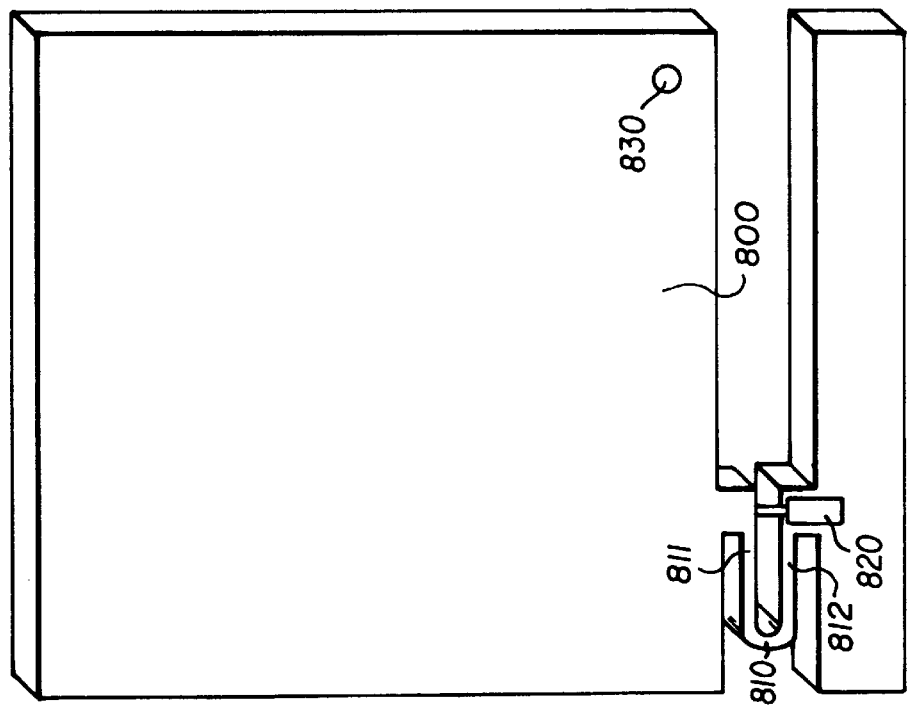
FIG. 8 illustrates one embodiment of a rotational translation stage using a flexure and linear actuator to move the stage about a pivot.

FIG. 8 presents a variation of the instant invention, in which small angular rotations can be achieved using the linear movement of the flexure. In this example, a single flexure 810 and linear translator 820 can move a translation stage 800 that is fixed at one point by a pivot 830. When the linear translator 820 pushes the flexure legs 811, 812 apart, the translation stage 800 moves in an arc about the pivot point 830, providing angular rotation. Proper design of this configuration could provide nearly linear correspondence between movement of the linear translator and rotation of the translation stage over small angular ranges.

What is claimed is:

1. A U-shaped mechanical first flexure for linear translation, comprising:

a first leg having a first length $L_1$, a first Young's modulus $E_1$, and a first moment of inertia $I_1$; and a second leg having a second length $L_2$, a second Young's modulus $E_2$, and a second moment of inertia $I_2$, wherein an end of the first leg is joined with an end of the second leg so that the two legs are substantially coextensive and parallel to each other in order to form a U-shaped structure, and wherein, when a force is applied to an unjoined end of the first leg along an axis through the unjoined end of the first leg and an unjoined end of the second leg, said unjoined leg ends move with respect to each other substantially along the axis, and wherein the first and second leg lengths, the first and second Young's modulus and the first and second movement of inertia are selected in order to obtain $$i^4+(7^n-5^n)i^3+(16n^2-65n^3+85n^4-36n^5)i^2+(5n^5+3n^6)i-n^7=0$$

wherein $$n=L_2/L_1 \text{ and } i=E_2I_2/E_1I_1$$

whereby translation of said unjoined leg is perfectly along said axis through said unjoined ends.

2. The mechanical flexure of claim 1, wherein the first and second legs are symmetrical.

3. The mechanical flexure of claim 1, wherein the first and second legs have the same length.

4. The mechanical flexure of claim 1, wherein the first and second legs have the same Young's modulus.

5. The mechanical flexure of claim 1, wherein the first and second legs have the same moment of inertia.

6. A translation mechanism, comprising:

a stationary component;

a movable translation stage; and a flexure having first and second legs joined together to form a U-shaped structure, said legs having respectively, Young's modulus and moment of inertia, wherein an unjoined end of the first leg of said flexure is attached to the stationary component and an unjoined end of the second leg of the flexure is attached to the movable translation stage, wherein when a force is applied along an axis through the unjoined ends of the first and second ends, the unjoined end of the second leg translates substantially along the axis, and wherein the first and second leg length, the first and second Young's modulus and the first and second moment of inertia are selected in order to obtain $$i^4+(7^n-5n^2)i^3+(16n^2-65n^3+85n^4-36n^5)i^2+(5n^5+3n^6)i-n^7=0$$

wherein $n=L_2/L_i$ $i=E_2I_2/E_1I_1$ $L_1$=length of first leg $L_2$=length of second leg $E_1$=Young's modulus of fit leg $E_2$=Young's modulus of second leg $I_1$=moment of inertia of first leg $I_2$ moment of inertia of second leg causing the translation stage to move in a straight line relative to the stationary component.

7. The translation mechanism of claim 6, further comprising a linear translator wherein a movement of said linear translator causes the translation stage to move along the axis.

8. The translation mechanism of claim 7, wherein the linear translator engages the second leg of the flexure.

9. The translation mechanism of claim 7, wherein the linear translator engages the unjoined end of the second leg of the flexure.

10. The translation mechanism of claim 7, wherein the linear translator engages the translation stage.

11. A translation mechanism comprising:

a stationary component;

a movable translation stage; and a pair of flexures, each of the flexures having a first leg having a first length $L_i$, a first Young's modulus $E_i$ and a first moment of inertia $I_i$ and a second leg having a second length $L_j$, a second Young's modulus $E_j$ and a second moment of inertia $I_j$, and wherein said first and second legs are joined together to form a U-shaped structure, wherein a first unjoined leg end of each of the flexures is attached to the stationary component and a second unjoined leg end of each of the flexures is attached to the movable translation stage, so that the lines joining the unjoined ends of each flexure are parallel to each other, and wherein in each flexure, when a force is applied to the second unjoined leg end along an axis through the first and second unjoined leg ends, the first and second unjoined leg ends move with respect to each other substantially along the axis, and wherein for each flexure, the first and second leg length, the first and second Young's modulus and the first and second moment of inertia are selected in order to obtain:

$$i^4+(7n-5n^2)i^3+(16n^2-65n^3+85n^4-36n^5)i^2+(5n^5+3n^6)i-n^7=0$$

wherein $n=L_j/L_i$ and $i=E_jI_j/E_iI_i$ causing the translation stage to move in a straight line relative to the stationary component.

12. A translation mechanism, comprising:

a stationary component;

a movable component oriented at an angle with the stationary component;

a movable translation stage;

a first pair of flexures, each of the flexures having a first leg having a first length $L_i$, a first Young's modulus $E_i$ and a first moment of inertia $I_i$ and a second leg having a second length $L_j$, a second Young's modulus $E_j$ and a second moment of inertia $I_j$, and wherein said first and second legs are joined together to form a U-shaped structure, wherein a first unjoined leg end of each of the flexures of the first pair of flexures is attached to the stationary component and a second unjoined leg end of each of the flexures is attached to the movable component so that the lines joining the unjoined ends of each flexure of the first pair of flexures are parallel to a first axis, and wherein, in each flexure of the first pair of flexures, when a force is applied along said first axis through the respective second unjoined leg ends, the unjoined leg ends translate substantially along the first axis, and wherein for each flexure, the first and second leg lengths, the first and second Young's modulus and the first and second moment of inertia are selected in order to obtain:

$$i^4+(7n-5n^2)i^3+(16n^2-65n^3+85n^4-36n^5)i^2+(5n^5+3n^6)i-n^7=0$$

wherein $$n=L_j/L_i \text{ and } i=E_jI_j/E_iI_i$$

causing the movable component to move in a first straight line relative to the stationary component along the first axis; and a second pair of flexures, each of the second pair of flexures having a leg having a first leg $L_j'$, a first Young's modulus $E_j'$ and a first moment of inertia $I_j'$ and a second leg having a second length $L_j'$, a second Young's modulus $E_j'$ and a second moment of inertia $I_j'$ and wherein said first and second legs are joined together to form a U-shaped structure, wherein a first unjoined leg end of each of the second pair of flexures is attached to the movable component and a second unjoined leg end of each of the second pair of flexures is attached to the movable translation stage so that the lines joining the unjoined ends of each flexure of the second pair of flexures are parallel to a second axis, and wherein, in each flexure of the second pair of flexures, when a force is applied along second axis through the respective second unjoined leg ends of the second pair of flexures, the respective second unjoined leg ends of the second pair of flexures translate substantially along the second axis and, wherein, for each flexure of the second pair of flexures, the first and second leg length, the first and second Young's modulus and the first and second moment of inertia are selected in order to obtain $$i^4+(7n'-5n'^2)i^3+(16n'^2-65n'^3+85n'^4-36n'^5)i^2+(5n'^5+3n'^6)i-n'^7=0$$

wherein $$n'=L'_j/L'_i \text{ and } i=E_jI'_j/E_iI'_i$$

causing the movable component and the movable translation stage to move in a second straight line relative to the stationary component along the second axis.

* * * * *

UNITED STATES PATENT AND TRADEMARK OFFICE
CERTIFICATE OF CORRECTION

PATENT NO. : 5,802,914
DATED : 09/08/98
INVENTOR(S) : Werner Fassler, et al

It is certified that error appears in the above-identified patent and that said Letters Patent is hereby corrected as shown below:

| | |
|---|---|
| Col. 6, Claim 6, line 6 | delete "fit" and insert --first-- |
| Col. 6, Claim 11, line 29 | delete both occurrences of subscript "$i$" and insert subscript --$j$-- |
| Col. 6, Claim 11, line 30 | delete subscript "$i$" and insert subscript --$j$-- |
| Col. 6, Claim 11, line 44 | delete "length" and insert --lengths-- |
| Col. 6, Claim 12, line 64 | delete both occurrences of subscript "$i$" and insert subscript --$j$-- |
| Col. 6, Claim 12, line 65 | delete subscript "$i$" and insert subscript --$j$-- |
| Col. 7, Claim 12, line 28 | delete subscript "$j$" and insert subscript --$i$-- |
| Col. 7, Claim 12, line 29 | delete both occurrences of subscript "$j$" and insert subscript --$i$-- |
| Col. 8, Claim 12, line 21 | delete the complete equation and substitute therefor, new equation $$-i'^4 + (7n'-5n'^2)i'^3 + (16n'^2 - 65n'^3 + 85n'^4 - 36n'^5)i'^2 + (5n'^5 + 3n'^6)i' - n'^7 = 0--$$ |
| Col. 8, Claim 12, line 27 | delete the complete equation and substitute therefor, new equation $-- n' = L'_j / L'_i \text{ and } i' = E_j \Gamma_j / E_i \Gamma_i --$ |

Signed and Sealed this

Fourth Day of January, 2000

Attest:

Attesting Officer

*Acting Commissioner of Patents and Trademarks*